Patented Dec. 1, 1936

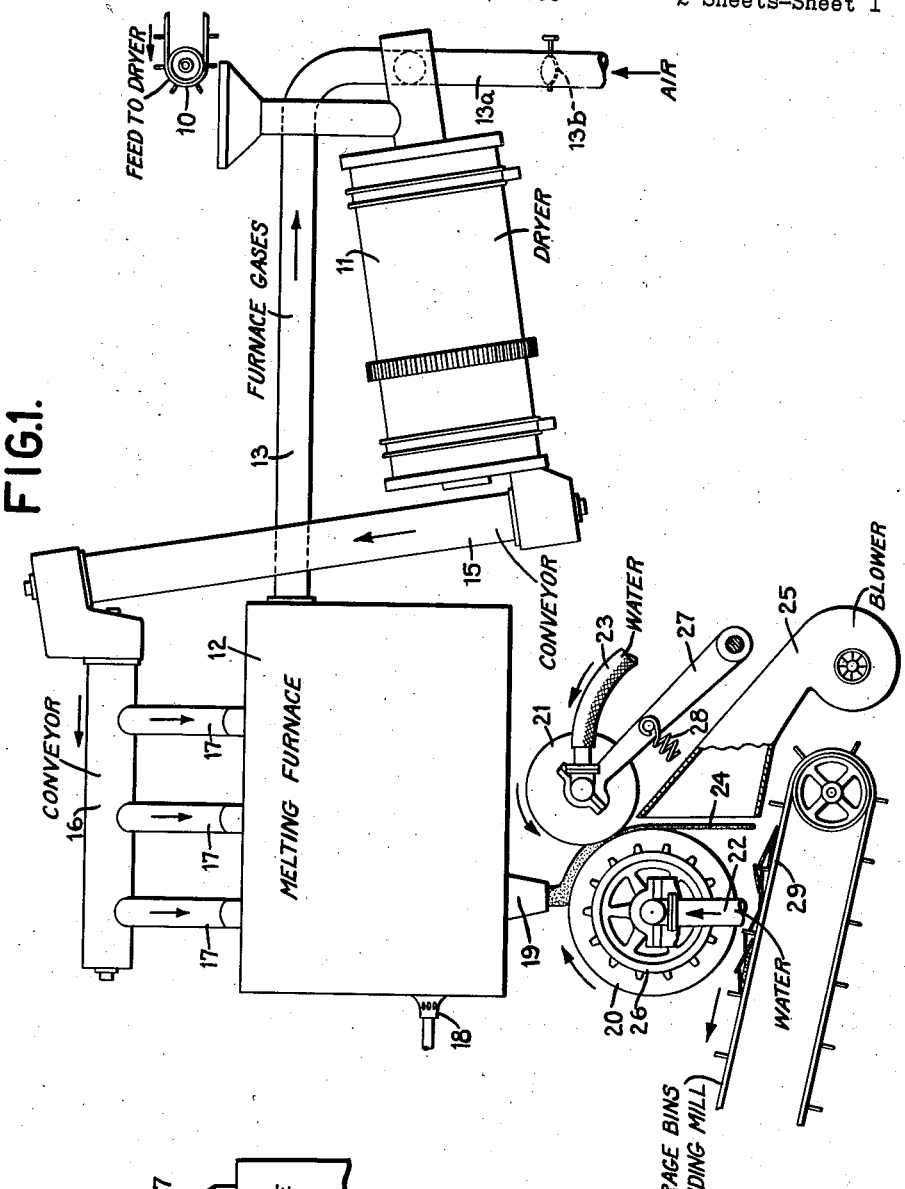
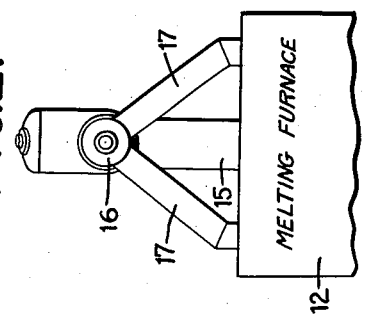

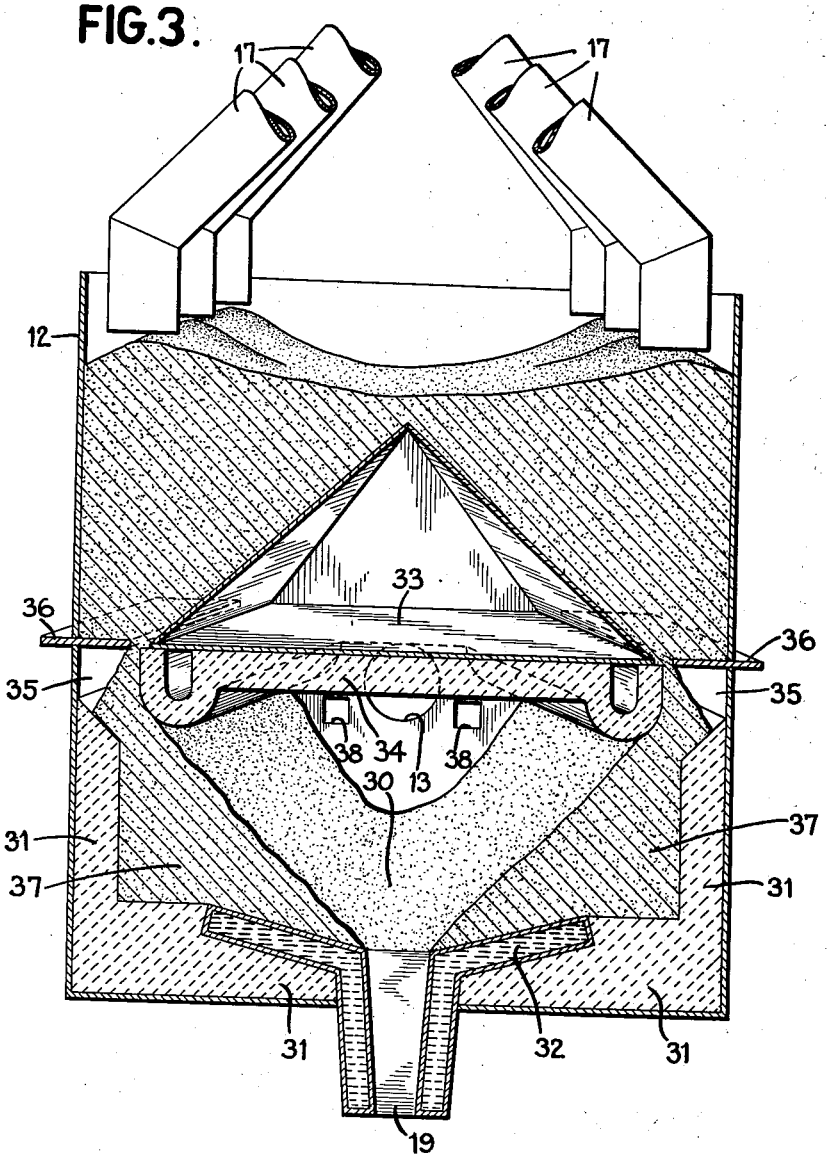

2,062,650

UNITED STATES PATENT OFFICE 2,062,650

PRODUCTION OF NONCRYSTALLINE BORAX

Henry D. Hellmers, Westend, Calif., assignor to West End Chemical Company, Westend, Calif., a corporation of California Application January 23, 1935, Serial No. 3,072

6 Claims. (Cl. 23—59)

The present invention relates to the conversion of hydrated borax, for example the decahydrate, into the non-crystalline form commonly known as "borax glass". The usual method of making the glass form of the compound is by melting a batch of the hydrate and holding it in the molten state until the water is expelled by evaporation and then discharging the molten salt into molds for solidification. The removal of the water (free and combined) by that method requires considerable time, and it has therefore been proposed to subject the hydrate to a preliminary drying by which a substantial part of the water is eliminated. In this way the formation of a solution of the salt in its own water of crystallization was prevented and true fusion quickly effected. The real saving of time was relatively small, however, for it was found that when the salt was removed from the furnace shortly after melting and allowed to cool to solidification in the usual way, crystallization ensued, due, I believe, to the comparatively very small amount of water remaining in the mass even after complete fusion. On the other hand, if the salt is held in the molten state long enough to permit solidification in the glass-like amorphous (i. e., non-crystalline) form the blocks so produced are exceedingly difficult to break up into the granular form often demanded by the trade, and this difficulty not only increased the cost but also resulted in contamination of the product by the material of which the grinding or crushing apparatus is made.

I have accordingly been led to devise my present invention, of which an important object is to provide a simple method and apparatus for producing borax in "glass" form at low cost.

A further object is to provide a method and apparatus which will obviate the necessity of eliminating the last trace of water from the molten borax before it is cast.

Another object is to provide a method and apparatus by which crystallization of the borax in solidifying is prevented even though the salt contains enough water to result in crystallization when solidification is effected by prior casting processes.

Still another object is to provide a continuous process for the purpose and an effective and economical apparatus for practicing the same.

To these and other ends the invention comprises the novel features and combinations hereinafter described.

In the course of an extended investigation I have discovered that for the production of borax glass, holding the salt molten for a time long enough to remove the last trace of water is not necessary, but that regardless of the presence of hydrated borax suspended in it the molten salt can be cast at once, and without crystallizing, provided it is promptly solidified throughout by rapid cooling. Such cooling can be readily effected by means of one or more water-cooled rolls, by which the "glass" is also shaped into a thin thread-, ribbon-, or sheet-like form. This method of producing the necessary quick cooling is preferred, but the invention is not limited to that specific procedure.

In carrying out my invention in the preferred manner, it is desirable to give the hydrated borax, especially the decahydrate, a preliminary dehydration in a drying zone of gradually decreasing temperature to remove enough of the moisture present to prevent the salt from dissolving in its own water of crystallization when it is afterwards subjected to the temperature of the melting furnace. In general, the removal of 50 per cent of the total water from the decahydrate is enough for the purpose. This removal can be effected by means of a rotary dryer, more or less of the necessary heat being obtained by utilizing hot gases from the melting furnace. Any additional heat required can be furnished by one or more gas or oil burners. In the preferred practice the hydrated salt is supplied continuously into one end of the dryer and from the other end the partially dried salt is delivered to the furnace, in which is provided a zone of relatively high temperature where the borax is subjected to the fusing temperature and is rapidly melted. As the salt melts, it flows out of the furnace, continuously, upon the larger of a pair of cooperating water-cooled rolls or drums, by which it is formed into a thin sheet or layer and chilled with sufficient rapidity to prevent crystallization. The discharge of the molten borax from the furnace may so quickly follow melting that the outflowing mass contains nuclei or small lumps of unmelted partially dehydrated borax which would, except for the rapid solidification, cause the cooling material to crystallize. In general, the chilling may be rapid enough to solidify the sheet or layer practically completely in its passage between the rolls, but this is not necessary. As the sheet emerges from the rolls its contraction, due to the cooling, causes it to separate from the rolls, so that a scraper or doctor will seldom, if ever, be needed to detach it. As the sheet or layer leaves the rolls it may meet a blast of air, at room temperature or cooler if necessary, to insure complete solidification or adequate cooling. The sheet then descends upon a conveyor, breaking up as it does so into thin plates or pieces of various sizes, and is carried to storage, or to the grinding mill if a granular or pulverized product is desired. Sometimes the sheet breaks into rather large plates before reaching the conveyor. Being in the form of thin plates or fragments (preferably not more than about one-sixteenth of an inch thick), the grinding is easily effected in a ball mill, edge grinder, or other suitable apparatus with but little if any iron contamination. Any iron found in the ground material can be readily removed by means of a magnetic separator.

If the borax to be treated is in finely divided form, especially the floury form in which it is usually obtained from the brines or salt deposits of California, considerable trouble may be encountered by "dusting" in the drying zone and melting zone, particularly in the latter. I have found, however, that the fine or powdery borax can be readily converted into a coarse granular form, thereby obviating any serious trouble of the kind indicated. This conversion, which appears to be the result of an agglomeration of the fine particles, can be effected by subjecting the finely divided borax to a high temperature for a short time before it is delivered to the melting furnace. Apparently the agglomeration is due to incipient, superficial, or partial melting of some if not all of the particles in their contained water, thus making them more or less sticky, so that as they are tumbled about and subjected to the decreasing temperature of the drying zone the borax particles "ball up" in coarsely granular form. To produce the desired conversion most effectively it is recommended that the finely divided material be subjected to the high temperature as it enters the drying zone rather than at a later stage. Thus in the specific practice described below, the borax and the furnace gases (the latter diluted and more or less cooled by admixture with air) enter the dryer at the same end of the latter and travel together toward the outlet. It will be seen that no hard and fast rule as to what the agglomerating temperature should be in thermometer degrees can be laid down, since this depends in large measure upon such factors as the volume of the gases supplied to the dryer, the amount of borax to be dried, the extent of the dehydration desired, the agitation of the material (vigorous or gentle), etc., but a suitable temperature range can be readily found by taking samples of the product discharged from the dryer and determining therefrom whether the desired dehydration and agglomeration have been attained. If not, the inlet temperature can be varied accordingly.

In the accompanying drawings, which illustrate diagrammatically the preferred apparatus for carrying out the process described above:

Fig. 1 shows the apparatus in elevation, and

Fig. 2 is an end view of the furnace from the left of Fig. 1.

Fig. 3 is a cross section illustrating diagrammatically a preferred type of furnace for melting the borax and maintaining above the melting zone a supply of unmelted borax for delivery to said zone.

In the apparatus illustrated, the borax decahydrate is delivered by a conveyor 10 to a rotary dryer 11, receiving gases from the melting furnace 12 by a conduit or flue 13. The hot gases are diluted and cooled by admitting air to the flue, for example through a pipe 13a under suitable control, as by means of a damper 13b, to bring the temperature of the gases down to the desired value. From the dryer the partially dehydrated salt is carried by a screw conveyor 15 to a second screw conveyor 16 above the furnace, from which the material is discharged through branch pipes 17 into the furnace at the sides thereof. The heat needed to melt the borax is provided in any convenient and suitable way, as by means of one or more gas or oil burners 18, and the molten borax is discharged through one or more spouts 19. The furnace may be of any convenient and suitable type, but in order to avoid attack or fluxing effect on the lining of fire brick or the like by the molten borax the melting zone may be provided with a trough-shaped or V-shaped bed of unfused borax. The borax bed may be kept unfused by water-jackets, cooling coils, or the like, not shown, buried at or forming the bottom of the furnace.

As the borax is fused it runs out of the spout 19 and down upon the larger of the two hollow rolls or drums 20, 21, rotating on hollow trunnions or journals, connected to pipes 22, 23 at one end of the rolls and to similar pipes (not shown) at the other end of the rolls, for passing water or other cooling fluid through the rolls to maintain them at a temperature which will chill the molten borax but leave it sufficiently plastic to be spread into a thin sheet or layer, as indicated at 24. As the sheet or layer, preferably about a sixteenth of an inch thick, emerges from the rolls it meets a blast of air from the blower 25 by which complete solidification is insured. To avoid even a trace of crystallization the time required for solidification should be a matter of a few seconds, preferably four or five. Experience indicates that thirty seconds is in general too long.

Instead of driving the rolls individually, I prefer to drive only the larger, for example by a sprocket 26, and let the other be rotated by friction. It is also advantageous to make the rolls self-adjusting as to distance apart, as by mounting the smaller in a swinging frame 27. The weight of the roll then keeps it close enough to the other, aided by one or more springs 28, if necessary, to insure production of a sheet or ribbon of the desired thinness. Any mounting can be used which will afford the desired relative movement of the rolls to take care of non-uniform plasticity or irregular supply of the molten borax. The variation thus caused in the spacing of the rolls may give a plate or sheet of uneven thickness, but considerable variation in thickness is permissible. Below the rolls the descending sheet or layer strikes the conveyor 29, shattering as or before it does so, and the pieces, in the form of plates or sheets of various sizes, are carried away to storage bins or other receptacles, or to a grinding mill, not shown, where the thin pieces can be readily reduced to granular form without the production of an objectionable proportion of dust or fines.

The preferred type of furnace and melting zone therein is illustrated in cross section, more or less diagrammatic, in Fig. 3. As there shown the melting zone 30 arrows or tapers rearwardly and is in the lower part of the furnace, with a refractory lining 31. The water-cooled base, by which the borax adjacent to the lining is kept unmelted, is shown at 32, with the spout 19 forming part of it. Any convenient piping, not shown, may be provided for passing water or other cooling medium through said base. The melting zone is closed at the top by a rearwardly tapering and upwardly inclined cover 33 having a refractory lining 34. The upper part of the furnace, above the melting zone cover, is utilized as a bin for temporary storage of partially dehydrated borax received from the pipes or spouts 17. Between the melting zone cover 33 and the shell of the furnace are longitudinal openings or passages 35 which may be closed and opened at will by means of sliding gates 36. In operation, the gates just mentioned being closed, the borax at the surface of the trough-shaped bed 37 melts and runs down through the spout 19. As the operation goes on, the surface borax melts back, but before the melting back has proceeded far enough to uncover the melting zone inlet passages 35 the gates 36 are drawn out allowing borax from the bin to descend into the melting zone, after which the gates are closed and kept closed until further feed to the melting zone is desired. Peep-holes, as 38, may be provided in the front or rear wall, or both, for observing the melting operation and the delivery of borax from the supply in the bin. The peep-holes are equipped with suitable doors not shown. The described method of feeding the melting zone is advantageous in that it avoids the continual agitation that would result from constant inflow of the material. This is especially desirable when the melting zone is of large capacity, say one with a production of fifteen tons of molten borax per day of twenty-four hours.

Ordinarily the borax glass which I have produced by the process and apparatus described above contains a slight amount of water, usually not more than a trace, due apparently to the presence of small lumps or nuclei of unmelted or partially dehydrated borax in the molten outflow from the furnace, even though there be no visual or other evidence of such lumps or nuclei in the solidified sheet or layer.

It is to be understood that the invention is not limited to the specific apparatus and procedure herein illustrated and described, but can be carried out in other ways without departure from its spirit as defined by the following claims.

I claim:

1. In a continuous process of producing borax glass from borax containing combined water, passing the borax through a zone of sufficiently high temperature to dehydrate and melt the borax, discharging the borax from the melting zone substantially as fast as melting occurs, passing the borax between cooling surfaces moving closely adjacent to each other to press the borax into thin shape, and chilling the shaped borax to a temperature sufficiently low and at a sufficiently rapid rate to inhibit crystallization in solidifying.

2. In a continuous process of producing borax glass, passing hydrated borax through a drying zone heated to a temperature sufficient to cause agglomeration of the particles of borax but insufficient for complete fusion of the borax in its water of crystallization and evaporating from the borax in said zone sufficient moisture to prevent fusion of the borax in its water of crystallization when subsequently heated to a higher temperature, and while the borax is in said drying zone agitating the same to cause agglomeration of finer particles into coarser particles; passing the borax from the drying zone into and through a zone of sufficiently high temperature to dehydrate and melt the same, discharging the borax from the melting zone substantially as fast as melting occurs, passing the borax between cooling surfaces moving closely adjacent to each other to press the borax into thin shape, and chilling the shaped borax to a temperature sufficiently low and at a sufficiently rapid rate to inhibit crystallization in soldifying.

3. A continuous process of producing borax glass from borax containing combined water, comprising partially dehydrating hydrous borax to an extent sufficient to prevent subsequent fusion in its water of crystallization, passing the borax through a zone of sufficiently high temperature to melt the same, discharging the borax from the melting zone substantially as fast as melting occurs, passing the borax between rotating rolls to form the borax into a thin layer, and maintaining the rolls at a temperature sufficiently low to chill the layer sufficiently rapidly throughout to inhibit crystallization in solidifying.

4. A continuous process of producing borax glass as described in claim 3, with the additional step of further cooling the borax layer by blowing air upon the layer as it emerges from between the rolls.

5. In a process of producing borax glass from finely divided hydrous borax, in which the borax is heated for partial dehydration and agglomeration, the steps of passing the finely divided hydrous borax through a drying zone, subjecting the borax therein to a temperature sufficiently high to cause incipient fusion and thereafter to successively lower temperatures while agitating the borax to cause agglomeration into coarse particles, and concurrently evaporating sufficient moisture to prevent fusion of the borax in its water of crystallization when subsequently subjected to a temperature sufficiently high for complete melting.

6. In a process of producing borax glass from hydrous borax containing insufficient water of crystallization for fusion therein, the steps of melting such hydrous borax, and passing the molten borax between rotating rolls to form the borax into a thin layer and concurrently and rapidly cooling the layer to a sufficiently low temperature for solidification without crystallization.

HENRY D. HELLMERS.